United States Patent [19]
Winkelman et al.

[11] Patent Number: 5,235,512
[45] Date of Patent: Aug. 10, 1993

[54] SELF-TUNING SPEED CONTROL FOR A VEHICLE

[75] Inventors: James R. Winkelman, Birmingham; Michael K. Liubakka, Lincoln Park, both of Mich.

[73] Assignee: Ford Motor Company, Dearborn, Mich.

[21] Appl. No.: 720,102

[22] Filed: Jun. 24, 1991

[51] Int. Cl.$^5$ .............................................. B60K 31/04
[52] U.S. Cl. ........................ 364/426.04; 364/431.07; 123/352; 180/179
[58] Field of Search ................ 364/426.04, 431.07; 123/352; 180/170, 176, 179

[56] References Cited

U.S. PATENT DOCUMENTS

| | | | |
|---|---|---|---|
| 4,771,848 | 9/1988 | Namba et al. | 123/352 |
| 4,803,637 | 2/1989 | Tada et al. | 364/426.04 |
| 4,819,172 | 4/1989 | Takeuchi et al. | 364/431.07 |
| 4,840,245 | 6/1989 | Kamei et al. | 123/352 |
| 4,870,583 | 9/1989 | Takahashi et al. | 364/426.04 |
| 4,893,243 | 1/1990 | Tada et al. | 364/426.04 |

OTHER PUBLICATIONS

J. T. Ball, "Approaches and Trends in Automatic Speed Controls," SAE Technical Paper #670195, 1967.
W. C. Follmer, "Electronic Speed Control," SAE Technical Paper #740022, 1974.
B. Chaudhare et al., "Speed Control Integrated into the Powertrain Computer," SAE Technical Paper #860480, 1986.
T. Tabe et al,, "Vehicle Speed Control System Using Modern Control Theory," IEEE IECON '86 Proceedings, 1986.
M. Uriubara et al., "Development of Automotive Cruising Using Fuzzy Control System," Journal of SAE of Japan, vol. 42, No. 2, 1989.
T. Tsijii et al., "Application of Self-Tuning to Automotive Cruise Control," American Control Conference Proceeding, May, 1990.

*Primary Examiner*—Gary Chin
*Attorney, Agent, or Firm*—Allan J. Lippa, Roger L. May

[57] ABSTRACT

A self-tuning speed control system is disclosed. The gain of the system controller is tuned to provide optimal performance based upon a sensitivity point analysis and gradient optimization of a prescribed cost index.

4 Claims, 4 Drawing Sheets

SELF-TUNING SPEED CONTROL FOR A VEHICLE

BACKGROUND OF THE INVENTION

The present invention relates generally to a speed or cruise control for a vehicle and more particularly to an adaptive or selftuning speed control which continuously tunes controller gain so as to optimize performance.

Speed control systems are well known today. Each such system maintains the vehicle at a substantially constant speed selected by the operator.

One significant objective in the design of a speed control system is acceptable performance over a wide range of vehicle lines and over a wide range of operating conditions (often referred to as "robustness"). In this context, performance is measured in terms of a speed tracking ability, throttle movement, steady state speed error, and frequency of recalibration.

In an attempt to achieve the foregoing objective, and to meet increasingly stringent performance requirements, speed control systems have become increasingly more complex through the years. The earliest systems simply held the throttle in a fixed position (J. T. Ball, "Approaches and Trends in Automatic Speed Controls," SAE Technical Paper #670195, 1967). In the late 1950's, speed control with feedback appeared These systems used proportional feedback of the speed error, and the controller gain typically provided full throttle in response to an error in the range of six to ten miles per hour (mph) (W. C. Follmer, "Electronic Speed Control," SAE Technical Paper #740022, 1974).

The next enhancement was proportional control with an integral preset. Then came proportional integral control systems, often referred to as P.I. systems (B. Chaudhare et al, "Speed Control Integrated into the Powertrain Computer," SAE Technical Paper #860480, 1986). The combination of proportional and integral feedback, with appropriate controller gains, substantially reduced speed droop when the system was initialized.

Further enhancements are described in U.S. Pat. Nos. 4,803,637; 4,870,583; and 4,893,243. In general, system performance is improved by switching controller gains to predetermined values in accordance with specific operating conditions.

With the recent availability of inexpensive microcontrollers, more sophisticated control strategies have been attempted These include proportional integral derivative, or P.I.D., control; optimal linear quadratic regulation (T. Tabe et al, "Vehicle Speed Control System Using Modern Control Theory," IEEE IECON '86 Proceedings, 1986); fuzzy logic control (M. Uriubara et al, "Development of Automotive Cruising Using Fuzzy Control System," Journal of SAE of Japan, Vol. 42, No. 2, 1989); and self-tuning control (T. Tsijii et al, "Application of Self-Tuning to Automotive Cruise Control," American Control Conference Proceeding, May, 1990).

The objective is, again, a robust, stable speed control system. The potential saving from a single generic system capable of providing acceptable performance across a wide range of vehicle lines and over a wide range of operating conditions is enormous.

SUMMARY OF THE INVENTION

In a principal aspect, the present invention is a robust, stable self-tuning speed control system which provides good speed tracking and disturbance rejection, without excessive throttle jitter or steady state error. The system dynamically tunes controller gain based upon a sensitivity points analysis and a slow adaptation procedure.

The system is premised upon the identification of a vehicle model and a compatible controller model, i.e., a fixed gain controller which, when properly tuned, will produce the desired performance in the modelled vehicle These models form the basis for a sensitivity filter subsystem which provides a partial derivative of the speed signal with respect to the gain of the controller.

The sensitivity filter subsystem is coupled to a gradient subsystem which defines a cost index or function related to controller gain. Minimization of the cost index during vehicle operation, based upon the speed/gain partial derivative signal, determines an optimal gain for the controller, i.e., the gain which substantially optimizes speed control performance.

It is thus an object of the present invention to provide a self-tuning speed control system. Another object is a speed control system wherein controller gain is tuned to provide substantially optimal performance. Still another object is a generic speed control system capable of use over a complete range of vehicles.

It is also an object of the present invention to provide a self-tuning speed control utilizing a sensitivity point analysis. Yet another object is to adjust controller gain via a gradient method utilizing a sensitivity filter, based upon predeterminable transfer functions for the vehicle and a compatible controller, and minimization of a predetermined cost index.

These and other features, objects and advantages of the present invention are set forth or implicit in the following description.

BRIEF DESCRIPTION OF THE DRAWING

Preferred embodiments of the present invention are described, in detail, with reference to the drawing wherein.

DETAILED DESCRIPTION OF PREFERRED EMBODIMENTS

Figure 1:
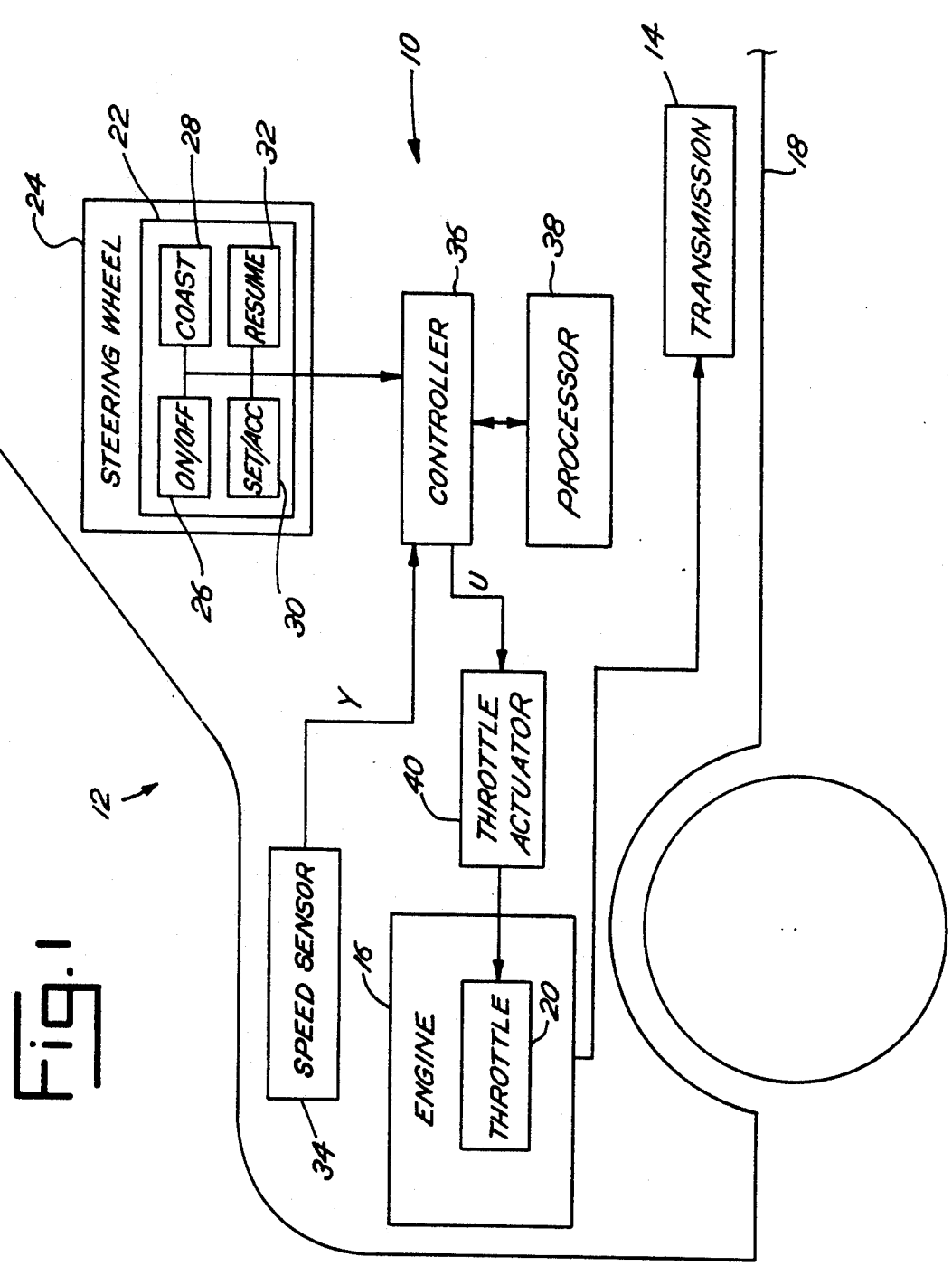
FIG. 1 is a schematic block diagram of a vehicle including a preferred embodiment of the present invention in the form of a self-tuning speed control system.

A preferred embodiment of the present invention is shown in the drawing as a self-tuning speed control system 10 for a vehicle, generally designated 12. The vehicle 12 includes an automatic (or manual) transmission 14, an engine 16 with a torque converter (or clutch), and a chassis 18.

With reference to FIG. 1, the speed control system 10 controls the engine throttle 20 in a conventional manner to provide a substantially constant speed For example, the system 10 includes a control assembly 22 mounted on the steering wheel 24. The assembly 22 includes the following operator controllable monitoring switches: ON/OFF 26, COAST 28, SET/ACCELERATE 30, and RESUME 32. One input from the control assembly 22 is a speed set pulse which establishes the desired vehicle speed "Yset."

The system 10 further includes a speed sensor 34, controller 36, processor 38 and throttle actuator 40, such as a stepper motor. The speed sensor 34 provides a speed signal "Y" representative of actual vehicle speed, and the error, i.e., Y−Yset, is designated herein as "e." As is well known in the art, the controller 36 monitors actual vehicle speed and stores the desired speed Yset in response to the speed set pulse. The controller 36 further issues a throttle position command "U" and the throttle actuator 40 responsively sets the throttle 20.

The system 10 additionally includes conventional deactivation, safety and back-up subsystems (not shown). Whenever the system 10 is deactivated, the controller 36, via the throttle actuator 40, sets the throttle 20 to an idle position.

Figure 2:
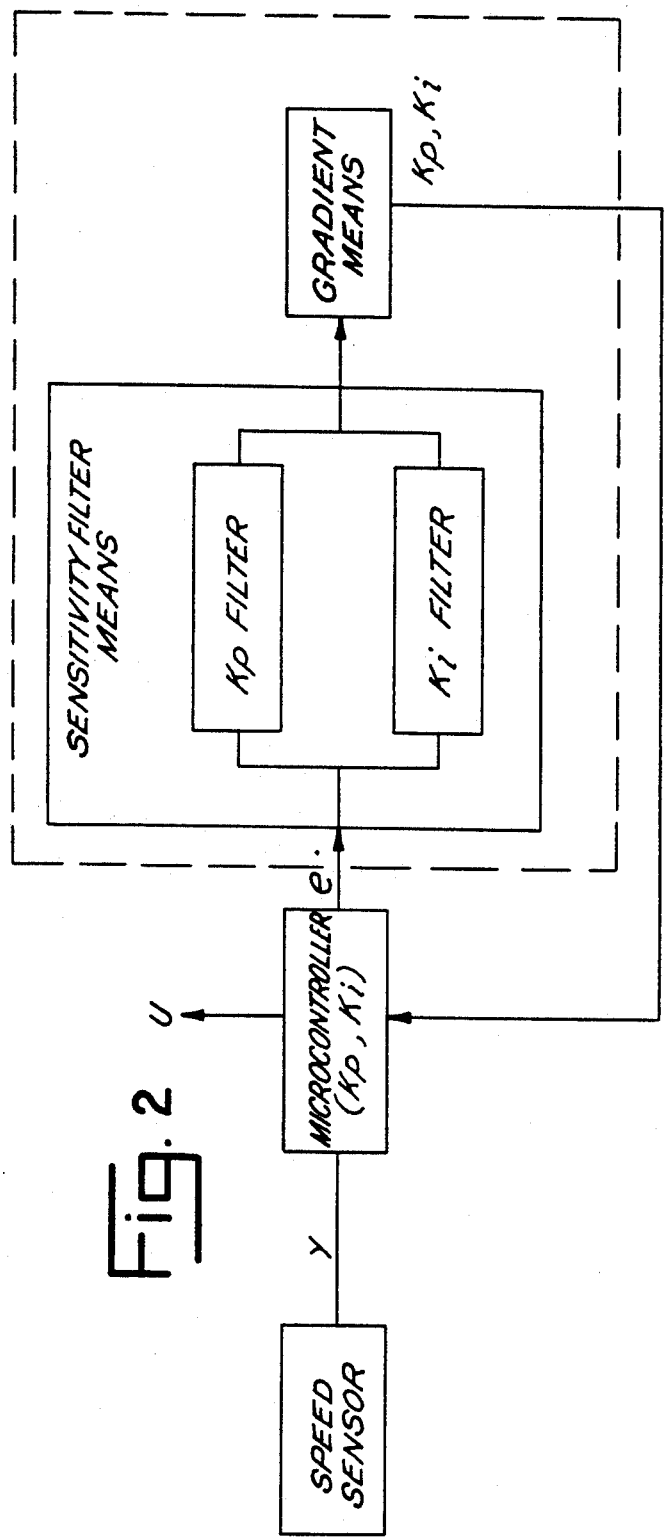
FIG. 2 is a partial schematic block diagram of the selftuning speed control.

In this preferred embodiment, and as best shown in FIG. 2, the controller 36 is a microcontroller programmed to operate in the manner of a proportional integral controller, i.e., having a proportional gain "$K_p$" and an integral gain "$K_i$." The controller 36 may further include any number of conventional enhancements, such as shown in the above-identified patents. For example, the controller 36 may be speed selective, such that the initial settings of the gains $K_p$ and $K_i$ or other controller parameters are determined by vehicle speed Y at the time of system initiation.

The self-tuning speed control system 10 continuously tunes the controller gains $K_p$ and $K_i$ to substantially optimize system performance. In general operational terms, the self-tuning system 10 regulates performance based upon a system sensitivity, i.e., system response with respect to a particular system parameter. In this preferred embodiment, a partial derivative of the system output with respect to controller gain is obtained through a sensitivity filter. Gain adaptation, driven by the vehicular response to unmeasured torque load disturbances, follows through minimization of a predetermined, gain-related cost index or function during real time operation of the vehicle 12.

Referring to FIG. 2, the system 10 includes sensitivity filter means 42, coupled to the control assembly 22 and speed sensor 34, and gradient means 44, coupled to the controller 36. Separate and discrete subsystems may be utilized; preferably, however, the function and operation of the sensitivity filter means 42 and gradient means 44, respectively, are performed by the microprocessor 38, as depicted. The controller 36, sensitivity filter means 42 and gradient means 44 may also be incorporated into a single microprocessor.

In this preferred embodiment, the system sensitivity is vehicle speed Y. The sensitivity filter means 42 receives the error signal e from the controller 36 and responsively provides at least one partial derivative thereof (which is identical to the partial derivative of the speed signal Y). More particularly, the sensitivity filter means 42 provides a partial derivative of the speed signal y with respect to each tunable parameter of the controller 36. In this preferred embodiment, the sensitivity filter means 42 includes a first or $K_p$ sensitivity filter 46 and a second or $K_i$ sensitivity filter 48.

The sensitivity filter means 42 is based upon a predeterminable nominal model of the vehicle 12 and an identifiable nominal fixed gain P.I. controller compatible therewith. That is, the system 10 is premised upon the development of (i) an acceptable nominal vehicle model (expressed as a vehicle or more particularly a throttle position-to-speed transfer function) and (ii) a nominal fixed gain P.I. controller model which will provide acceptable speed control performance when applied to the selected vehicle model (expressed as a controller transfer function).

Figure 3:
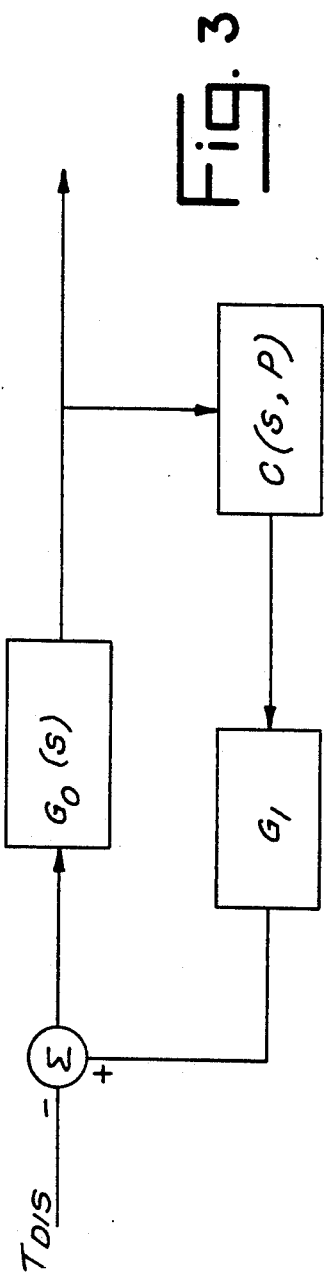
FIG. 3 is a schematic block diagram of a vehicle and controller of the type necessary to implement the present invention.

FIG. 3 illustrates simple vehicle and controller models of the type necessary for implementation of the present invention. The unmeasured torque disturbance input to the vehicle 12 is represented as "Tdis"; the transfer function for the vehicle dynamics is "$G_0(s)$"; powertrain gain is shown as "$G_1$"; and the transfer function for the compatible P.I. controller is "$C(s,P)$," P being a vector representation of $K_p$ and $K_i$.

Based thereon, the output Y is expressed as follows:

$$Y = \frac{-G_0(s)}{1 - C(s,P)G_1G_0(s)} Tdis.$$

Differentiation with respect to P reveals:

$$\frac{\partial Y}{\partial P} = \frac{G_1 G_0(s)}{1 - C(s,P)G_1G_0(s)} \frac{\partial C}{\partial P} Y.$$

Thus, the partial derivative of the speed signal Y with respect to any controller parameter, $\partial Y/\partial P$, is generated in real time by passing the system output through a sensitivity filter which is a copy of the system modified by the partial derivative of the controller transfer function with respect to the same parameter, $\partial C/\partial P$.

As is well known, the transfer function for a conventional fixed gain P.I. controller has the form:

$$C(s,P) = \frac{U(s)}{Y(s)} = -\left(K_p + \frac{K_i}{s}\right)$$

Figure 4:
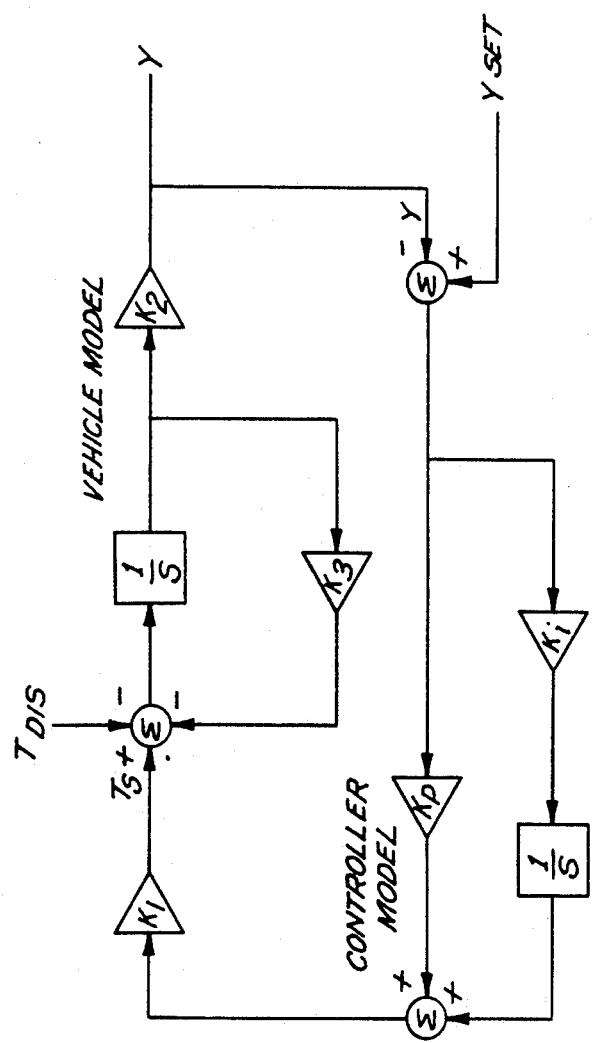
FIG. 4 illustrates a linear closed loop model of the vehicle and controller shown in FIG. 3.
Figure 5:
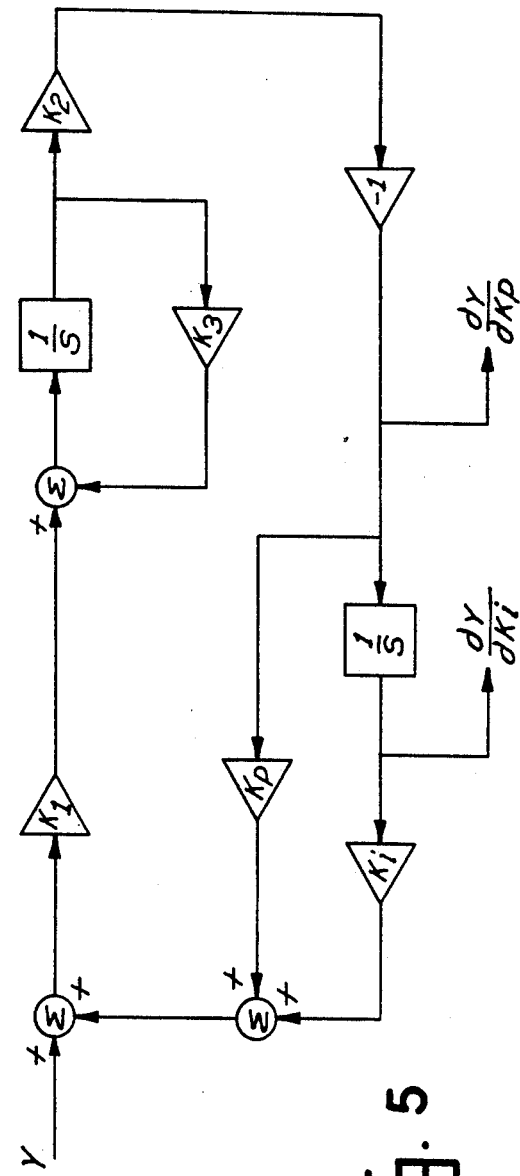
FIG. 5 is a block diagram of the sensitivity filter derived from the model shown in FIG. 4.

Thus, $\partial C/\partial K_p$ and $\partial C/\partial K_i$ are $-1$ and $-1/s$, respectively. The resulting conventional linear closed loop model for the vehicle 12 and compatible controller is shown in FIG. 4, wherein "Tw" represents drive torque at the wheels of the vehicle 12, and $K_1$, $K_2$ and $K_3$ represent the powertrain gain, the inverse of the time constant for the vehicle 12, and a speed conversion factor, respectively. The corresponding sensitivity filter means 42 is shown in FIG. 5.

Implementation of the sensitivity filter means 42 need only take a nominal or approximate form to substantially ensure convergence of the gains within the speed control system 10. Preferably, the vehicle and controller models are empirically derived from an average or mid-range vehicle with a mid-range engine so as to substantially enhance the robustness of the system 10.

The system sensitivities, $\partial Y/\partial K_p$ and $\partial Y/\partial K_i$, are received by the gradient means 44, and the controller gains $K_p$ and $K_i$ are responsively tuned using a gradient optimization technique. The gradient means 44 is preprogrammed with a quadratic cost index which, when minimized, establishes the optimal gains.

Figure 6:
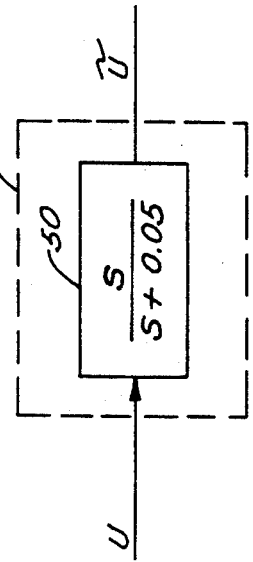
FIG. 6 is a block diagram of a high pass filter.

In this preferred embodiment, the cost index, given below, contains a speed error component and a high frequency throttle component:

$$J(P) = \int_0^\infty (\beta_1 U^2 + \beta_2 e^2) dt$$

where P is again a vector representation of the controller gains $K_p$ and $K_i$ and $\beta_1$ and $\beta_2$ represent and define a vector weighting. A cost index based solely on speed error could result in unduly high controller gains and excessive throttle movement. The term U represents the control command due to disturbance inputs and is obtained by passing the throttle position command U through a high pass filter 50 shown in FIG. 6. Use thereof penalizes high frequency throttle movement. In this preferred embodiment, the high pass filter 50 forms a part of the sensitivity filter means 42.

To minimize J(P), the following gradient algorithm is used:

$$\frac{dK_p}{dt} = -\epsilon \left( \beta_{1,K_p} \overline{U} \frac{\overline{\partial U}}{\partial K_p} + \beta_{2,K_p} e \frac{\partial Y}{\partial K_p} \right)$$

$$\frac{dK_i}{dt} = -\epsilon \left( \beta_{1,K_i} \overline{U} \frac{\overline{\partial U}}{\partial K_i} + \beta_{2,K_i} e \frac{\partial Y}{\partial K_i} \right)$$

where $\epsilon_1$ and $\epsilon_2$ are adaptation gains. This algorithm requires additional sensitivity filtering of $\partial U/\partial P$ to generate $\partial U/\partial K_p$ and $\partial U/\partial K_i$. In this preferred embodiment, the necessary filtering is provided by the sensitivity filter means 42 in a conventional fashion under control of the processor means 38.

Figure 7:
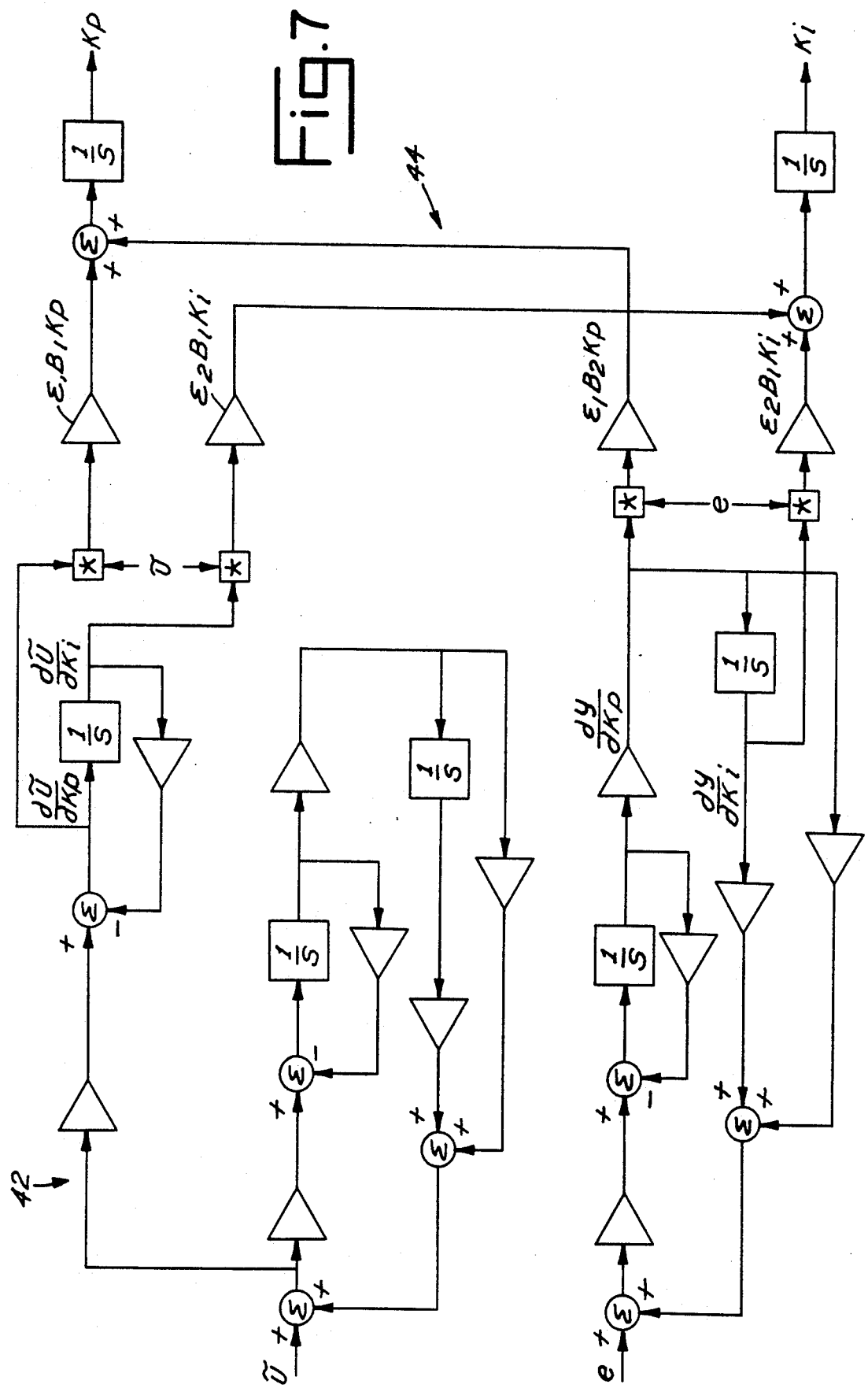
FIG. 7 is a schematic diagram illustrating the algorithm of the gradient means forming a part of the self-tuning speed control.

The gradient algorithm is shown schematically in FIG. 7. To implement this adaptive law in the processor 38, conversion to a discrete form is necessary, preferably utilizing first order low pass filters of the form $$\frac{a(z + 1)}{z + \gamma}.$$

This implementation minimizes the necessary memory and coding requirements and avoids the numerical issues of higher order filters.

The adaptation gains $\epsilon_1$ and $\epsilon_2$ determine the speed of adaptation and are preferably based upon the slowest dynamics within the vehicle plant. The dominant dynamics result from vehicle inertia and have a time constant on the order of thirty (30) to fifty (50) seconds. To substantially avoid interaction between the states of the adaptive system 10 and plant, adaptation is at least an order of magnitude slower, and preferably convergence is achieved in the range of two (2) to ten (10) minutes, depending on the initial conditions and road load disturbances. The products $\epsilon_1\beta_1$, $\epsilon_1\beta_2$, $\epsilon_2\beta_1$ and $\epsilon_2\beta_2$, are experimentally derived to provide this system time constant.

There is a tradeoff with respect to the weightings of the cost index, $\beta_1$ and $\beta_2$. To decrease limit cycle or surging behavior, the ratio $\beta_1/\beta_2$ is increased. To improve tracking and transient speed error, the ratio is decreased.

The choice of weightings is preferably made iteratively based upon the predetermined and compatible fixed gain P.I. controller. For the $K_p$ and $K_i$ assigned to the controller model and the selected $\epsilon_1$ and $\epsilon_2$, the values of $\beta_1$ and $\beta_2$ are iterated until the adaptation converges to the assigned gains. Final refinement of the parameters $\beta_1$ and $\beta_2$ requires actual testing throughout the vehicle line and over the range of operating conditions.

In this preferred embodiment, the processor 38 monitors the throttle position and "freezes" the self-tuning gains $K_p$ and $K_i$ at predetermined limits thereof. While the assumption of a linear plant is sufficient under most conditions, nonlinearities such as those due to the throttle control limitations (i.e., wide open or fully closed throttle) may occur. Tuning is halted in any conventional fashion under control of the processor 38. Filter updating continues, however, such that gains are immediately tuned when the throttle limit is cleared.

The processor 38 also monitors and limits a rate of change for the gains $K_p$ and $K_i$. Generally, the choice of $\epsilon_1$ and $\epsilon_2$ provides sufficiently slow rates of change, but a problem may occur should the vehicle experience a large disturbance (e.g., when the driver overrides the speed control by rapidly and fully depressing the accelerator pedal). During events of this nature, the speed error and throttle commands become very large and may cause large gain changes. In this preferred embodiment, the rate change of $K_i$ is limited to a rate within the range of one (1) to four (4) (degrees/mph second)/second, while change $K_p$ is held to a rate within the range of ten (10) to twenty (20) (degrees/mph)/second. If exceeded, the processor 38 adjusts $\epsilon_1$ and $\epsilon_2$ through simple division by the smallest power of two (2) necessary to provide an acceptable rate of change.

The processor 38 also preferably monitors and limits the values of $K_i$ and $K_p$. As with any physical system, there are performance limitations. Here, for example, there is an upper limit on the frequency and amplitude of hills over which speed can be properly maintained. These limitations are not embodied in the adaptive algorithm, such that gain limits are appropriate. The upper gain limits are chosen to allow adequate tracking performance over the range of vehicles. The lower limits are set such that the low speed stability (i.e., elimination of noticeable limit cycles) is achieved whenever possible with the compatible fixed gain P.I. controller.

Finally, two conditions are required for stability of the self-tuning speed control system 10: a persistently exciting input condition and a phase condition on the sensitivity filter means 42. The persistently exciting condition is satisfied by the varying road disturbance input and by the inherent speed limit cycle due to system nonlinearities. To satisfy the second condition, the phase of the nominal sensitivity filters 44, 46 must be within ninety degree (±90°) of the phase of the actual sensitivity at the dominant frequencies. To substantially ensure that this phase condition is met over the vehicle line and over the range of operating conditions, the nominal filter values are, as described above, preferably selected for a mid-sized car with an average power engine. Furthermore, the gains $K_p$ and $K_i$ of the controller model are chosen near the center of the preferred ranges, respectively.

Preferred embodiments of the present invention have been described herein. It is to be understood that modifications and changes can be made without departing from the true scope and spirit of the present invention, which are defined by the following claims to be interpreted in view of the foregoing description.

What is claimed is:

1. A self-tuning speed control system for a vehicle, said vehicle having a movable throttle for controlling vehicle speed, said control system comprising, in combination:

a source of a set speed signal indicative of a desired vehicle speed;

speed sensing means for producing an actual speed signal indicative of the actual speed of said vehicle;

an actuator for moving said throttle in response to a throttle position command;

an adaptive controller for generating said throttle position command in response to said set speed signal, said actual speed signal, and at least one tunable gain value; and means for adaptively modifying said tunable gain value comprising, in combination:

means responsive to said actual speed signal for generating a sensitivity value, said sensitivity value being indicative of the rate of change of said actual vehicle speed with respect to a small change in said tunable gain values as determined by a model which approximates the dynamic characteristics of the combination of said vehicle and said adaptive controller;

means for generating an error signal having a magnitude related to the difference between said actual speed signal and said set speed signal; and means for repeatedly adjusting said tunable gain value by an incremental amount having a magnitude related to the product of said error signal and said sensitivity value.

2. A self-tuning speed control as set forth in claim 1 wherein said model comprises closed loop system consisting of the cascaded combination of:

means for generating a modeled speed signal in response to a modeled throttle position signal in accordance with a predetermined throttle-position-to-speed transfer function which models the dynamic performance of said vehicle, means for generating said modeled throttle-position signal in response to said modeled speed signal in accordance with the transfer function of a fixed-gain controller which models said adaptive controller, and means for deriving said sensitivity signal from said modeled speed signal.

3. A self-tuning speed control for a vehicle equipped with a powertrain for propelling said vehicle at a speed controllable by a movable throttle, said speed control comprising, in combination, means for sensing the speed of said vehicle to generate an actual speed value, a manually operated control input means for accepting a desired speed value, means for generating a speed error value equal to the difference between the magnitude of said actual speed value and said desired speed value, an controller for generating a throttle positioning command value in response to the combination of (a) a proportional component related to the product of said speed error value and a proportional gain value, and (b) an integral component related to the product of said speed error value and an integral gain value, said proportional gain value and said integral gain values being independently adjustable during vehicle operation to adaptively vary the dynamic response of said controller;

an actuator for moving said throttle in response to said throttle positioning command, and means for adaptively varying said proportional gain value which comprises:

means for modeling the dynamic characteristics of the combination of said vehicle and said controller to generate:

a first sensitivity value having a magnitude indicative of the rate at which said actual speed value changes as said proportional gain value changes, a second sensitivity value having a magnitude indicative of the rate at which the magnitude of said throttle command value changes as said proportional gain value changes, and means for repeatedly adjusting said proportional gain value by an incremental amount having a magnitude related to the weighted sum of said first and second sensitivity values.

4. A self-tuning speed control system as set forth in claim 3 further comprising, in combination, means for adaptively varying said integral gain value which comprising, means for modeling the dynamic characteristics of the combination of said vehicle and said controller to generate:

a third sensitivity value having a magnitude indicative of the rate at which said actual speed value changes as said integral gain value changes, a fourth sensitivity value having a magnitude indicative of the rate at which the magnitude of said throttle positioning command value changes as said integral gain value changes, and means for repeatedly adjusting said integral gain value by a second incremental amount having a magnitude related to the weighted sum of said third and fourth sensitivity values.

* * * * *